United States Patent [19]

Roberts

[11] 3,883,646

[45] May 13, 1975

[54] PREPARATION OF BERYLLIUM HYDRIDE
[75] Inventor: Charles B. Roberts, Midland, Mich.
[73] Assignee: The Dow Chemical Company, Midland, Mich.
[22] Filed: Dec. 28, 1967
[21] Appl. No.: 694,786

[52] U.S. Cl. .............................................. 423/645
[51] Int. Cl................................................ C01b 6/04
[58] Field of Search ....... 23/204, 360, 365; 423/645

[56] References Cited
OTHER PUBLICATIONS
Head et al., Di-t-Butylberyllium and Beryllium Hydride, J.A.C.S., 79, 3,687–3,689, July 20, 1957.

Primary Examiner—Benjamin R. Padgett
Assistant Examiner—E. A. Miller
Attorney, Agent, or Firm—Lloyd S. Jowanovitz; C. Kenneth Bjork

[57] ABSTRACT

A process for preparing beryllium hydride by the direct reaction of beryllium borohydride and aluminum hydride trimethylamine adduct. Volatile by-products and unreacted reactants readily are removed from the product mass by sublimation and/or evaporation.

3 Claims, No Drawings

PREPARATION OF BERYLLIUM HYDRIDE

BACKGROUND OF THE INVENTION

This invention relates to the preparation of light metal hydrides and more particularly is concerned with a novel process for the preparation of beryllium hydride.

Beryllium hydride (BeH$_2$) because of its low molecular weight combustion products and relatively high heat energy output upon combustion is a preferred fuel for solid and hybrid rocket propellants. However, this compound heretofore has been prepared only with difficulty in multistep, complicated and/or expensive time consuming operations. Conventional practices ordinarily followed in the preparation of this compound have been direct combination of the elements or through solution chemical techniques.

It is a principal object of the present invention to provide a novel process for preparing beryllium hydride.

It is another object of the present invention to provide a process for the preparation of beryllium hydride by the neat reaction of two reactant materials wherein by-product materials and any unreacted reactants readily are separated from the desired product by simple evaporation or sublimation operations.

It is also an object of the present invention to provide a process for preparing beryllium hydride employing reactants which are sublimable and thereby readily purified.

These and other objects and advantages of the present invention will become apparent from the detailed description disclosed hereinafter.

SUMMARY

The present invention comprises reacting aluminum hydride trimethylamine adduct [AlH$_3$·N(CH$_3$)$_3$] and beryllium borohydride [Be(BH$_4$)$_2$] at from about room temperature to about 60°C. for a period of from about 5 minutes to 2 hours or more, removing volatile by-product and unreacted reactant materials from the reaction mass and recovering the beryllium hydride.

DESCRIPTION OF PREFERRED EMBODIMENTS

In the actual practice of the present invention usually high purity beryllium borohydride and aluminum hydride trimethylamine adduct are mixed together at room temperature and atmospheric pressure. Upon mixing an exothermic reaction occurs and the preparation of beryllium hydride, as evidenced by cooling of the mixture, appears to be complete within a period of from 5 to about 10 minutes. To assure the maximum in product yield, usually the reaction mixture is heated at from about 40° to about 60°C. under a reduced pressure for up to about two hours following completion of the initial exothermic reaction to assure completion of the reaction and removal of the more volatile mix components. After this period, the reaction mass is heated from about 75° to about 100°C. while applying a reduced pressure, e.g., a maximum of about 1 millimeter mercury absolute, to remove volatile components from the system.

The beryllium borohydride and aluminum hydride trimethylamine adduct are employed to provide at a minimum Be(BH$_4$)$_2$/AlH$_3$.N(CH$_3$)$_3$ molar proportions of 3/2. These quantities are about stoichiometric for one postulated manner in which the reaction is believed to proceed as shown in the following equation:

$$2AlH_3 \cdot N(CH_3)_3 + 3Be(BH_4)_2 \rightarrow 3BeH_2 + 2Al(BH_4)_3 \cdot N(CH_3)_3$$

Preferably beryllium borohydride in excess of this molar proportion is employed. Generally, in the preferred practice, beryllium hydride in a quantity to provide from about 2 to about 3 gram moles of beryllium borohydride per mole of aluminum hydride trimethylamine adduct is used. The presence of the excess beryllium borohydride reactant serves to aid in forcing the reaction to completion. Further, any excess beryllium borohydride readily is removed from the beryllium hydride product by sublimation. The so-recovered reactant can be reused in subsequent beryllium hydride preparations.

Since the initial reaction is exothermic, for maintaining control of the system, particularly in relatively large operations, it is to be understood that the reaction vessel can be fitted with a cooling means, e.g., heat exchange coil, refrigeration system and the like cooling means to limit the initial maximum temperature to that set forth hereinbefore. Alternatively, temperature control can be achieved by incrementally or continuously adding the reactants one to the other in a controlled manner so as to not provide large amounts of heat by the additions.

To assure optimum in product purity, ordinarily the reactants are purified before use. Conveniently, both the beryllium borohydride and the aluminum hydride trimethylamine adduct reactants can be purified by sublimation.

The aluminum hydride trimethylamine adduct usually is made by reacting at or slightly above room temperature lithium aluminum hydride (LiAlH$_4$) and trimethylamine hydrochloride [(CH$_3$)$_3$N·HCl] in an inert liquid organic carrier, e.g., benzene, which is a solvent for the adduct. Lithium chloride precipitates in the reaction mass. This solid readily can be separated from the product mixture leaving a solution of the aluminum hydride trimethylamine adduct. The solvent is removed, as by evaporation under a partial vacuum, leaving the solid aluminum hydride trimethylamine adduct. This product, although of a high purity as produced can be further purified by sublimation at about 45°C. under a reduced pressure, e.g., about 1 micron mercury absolute. In preparing the aluminum hydride trimethylamine adduct, at a minimum about stoichiometric quantities of the reactants are employed. For optimum in product purity, an excess of from about 15 to 20 weight percent lithium aluminum hydride over that required stoichiometrically for reaction with the trimethylamine hydrochloride to prepare the aluminum hydride trimethylamine adduct is used. As indicated hereinbefore, the adduct readily can be separated from this excess reactant by sublimation.

For optimum yields and highest product purity all operations are carried out in an inert atmosphere which is substantially moisture free, e.g., dry nitrogen or argon.

The following Example will serve to further illustrate the present invention but is not meant to limit it thereto.

EXAMPLE

Preparation of Aluminum Hydride Trimethylamine Adduct Reactant

About 9 grams of lithium aluminum hydride was slurried in about 300 cubic centimeters of benzene in a 500 milliliter flask at about room temperature under a substantially anhydrous inert atmosphere. About 19.2 grams of trimethylamine hydrochloride rapidly was added to this slurry with stirring. During this addition, the temperature of the reaction mass rose to about 50°C. The resulting product mixture was allowed to stand for about 1 hour after the completion of the trimethylamine hydrochloride addition and the lithium chloride which had been precipitated therein was removed by filtration. The benzene liquid carrier was removed from the product solution at a reduced pressure leaving a solid product of aluminum hydride trimethylamine adduct. The yield of this product was about 80 percent. This product was recovered in high purity form by sublimation at about 45° and a pressure of about 1 micron mercury absolute.

The Raman spectrum of the aluminum hydridetrimethylamine adduct was determined and found to be as follows:

| Wave No. | Intensity | Wave No. | Intensity |
|---|---|---|---|
| 2291 | med. w. | 1441 | med. |
| 2969 | m.w. | 1399 | v.w. |
| 2926 | m.w. | 1248 | v.w. |
| 2905 | m.w. | 1098 | v.w. |
| 2846 | m.w. | 1000 | med. |
| 2777 | w. | 891 | s. |
| 1795 | v.s. | 743 | v.w. |
| 1473 | w. | 663 | v.w. |

This material exhibited an infrared absorption spectrum having absorption bands or peaks at about 640cm-1; 730cm-1; 1,000cm-1; 1,095cm-1; 1,220cm-1; 1,245cm-1; 1,340cm-1; 1,410cm-1; 1,450cm-1; 1,480cm-1; 1,760cm-1 and a rather broad band at 1,820 to 1,830 cm-1.

Preparation of Beryllium Hydride

About 1 gram of aluminum hydride trimethylamine adduct (~0.01 gram mole) and about 1.2 grams of beryllium borohydride (~0.03 gram mole) were mixed together in a reaction vessel under a substantially anhydrous nitrogen atmosphere. Upon mixing of the reactants, the temperature rose to a maximum of about 55°C. and a slurry formed. The temperature of the reaction mass started to drop after about 10 minutes whereupon the system was subjected to a reduced pressure of about 1 millimeter mercury absolute and external heating applied to maintain the temperature at about 55°C. The reaction mass was held at these temperature and pressure conditions for about 1 hour during which time the bulk of the volatile liquid phase was removed. The temperature then was raised to about 80°C. and heating continued under the reduced pressure until all liquid appeared to have been removed and a dry, fine white solid remained.

Elemental analysis of this product mass gave Be-41.0%; Al-28.4%; B-6.8%; C-6.5%; H-15.0%; N-2.3%. This analysis is indicative of a product mixture containing 75 mole percent of the beryllium hydride product in admixture with lesser amounts of aluminum hydride, aluminum borohydride and beryllium borohydride trimethylamine adduct. This analysis indicated that the relative molar proportions of $BeH_2/AlH_3/Al(BH_4)_3$-/$Be(BH_4)_2 \cdot N(CH_3)_3$ in the product mass were approximately 4.3/1/0.1/0.2. The infrared spectrum of the product mass showed absorption for Be—H bonding consistent with that of beryllium hydride thus confirming the beryllium hydride product formation.

By subjecting the product mass to further heating at from about 75° to 100°C. under a low absolute pressure volatile by-product materials are further removed from the substantially non-volatile beryllium hydride thereby providing for further separation and purification of the beryllium hydride product. Also, the aluminum hydride content of the product can be reduced by converting this material in situ to the amminate and removing the resulting volatile amminate by heating as set forth hereinbefore.

In a second preparation, following the procedure set forth directly hereinbefore about 0.8 of beryllium borohydride was reacted with one gram of aluminum hydride trimethylamine adduct, i.e., a $Be(BH_4)_2/AlH_3 \cdot N(CH_3)_3$ molar ratio of about 2.1. The initial product mass from this preparation showed a mixture of about 28.5 percent beryllium hydride, about 39.5 percent aluminum hydride and about 25.6 percent beryllium borohydride trimethylamine adduct. The relative molar proportions of the $BeH_2/AlH_3$-/$Be(BH_4)_2 \cdot N(CH_3)_3$ components in this product mass is 1/0.5/0.1 indicating that beryllium hydride comprised about 60 mole percent of the product mass. Subsequent high temperature-low pressure purification of the mass as disclosed hereinbefore is used to separate the by-product impurities from the beryllium hydride product.

Various modifications can be made in the present invention without departing from the spirit or scope thereof for it is understood that I limit myself only as defined in the appended claims.

I claim:

1. A process for preparing a beryllium hydride product which comprises:
   a. reacting beryllium borohydride and aluminum hydride trimethylamine adduct in quantities sufficient to provide a $Be(BH_4)_2/AlH_3 \cdot N(CH_3)_3$ molar ratio of at least 3/2, said reaction being conducted at from about room temperature to about 60°C. for a period of from about 5 minutes to about 2 hours, and in the presence of an inert, substantially moisture free atmosphere, and
   b. heating the resulting product mass at a temperature of from about 75° to about 100°C. and a maximum pressure of about 1 millimeter mercury absolute thereof to separate and remove volatile by-product materials and unreacted reactants from the beryllium hydride product.

2. The process as defined in claim 1 wherein the beryllium borohydride and aluminum hydride trimethylamine adduct are employed in a $Be(BH_4)_2/AlH_3 \cdot N(CH_3)_3$ molar ratio ranging from about 2 to about 3.

3. The process as defined in claim 1 wherein after an initial exothermic reaction upon mixing the reaction mixture of said beryllium borohydride and said aluminum hydride trimethylamine adduct is heated to and maintained at from about 55° to about 60°C. and a maximum pressure of about 1 millimeter mercury for a period of about 2 hours.

* * * * *